US009197907B2

(12) United States Patent
Phillips et al.

(10) Patent No.: US 9,197,907 B2
(45) Date of Patent: Nov. 24, 2015

(54) ADAPTIVE ADS WITH ADVERTISING MARKERS

(75) Inventors: Chris Phillips, Hartwell, GA (US); Bob Forsman, Sugar Hill, GA (US); Charles Dasher, Lawrenceville, GA (US); Jennifer Reynolds, Duluth, GA (US); Steve Martin, Centennial, CO (US)

(73) Assignee: ERICSSON AB, Stockholm (SE)

( * ) Notice: Subject to any disclaimer, the term of this patent is extended or adjusted under 35 U.S.C. 154(b) by 1058 days.

(21) Appl. No.: 13/269,026

(22) Filed: Oct. 7, 2011

(65) Prior Publication Data

US 2013/0091521 A1 Apr. 11, 2013

(51) Int. Cl.
*H04N 7/173* (2011.01)
*G06Q 30/00* (2012.01)
*H04N 7/16* (2011.01)
*H04N 21/234* (2011.01)
*H04N 21/482* (2011.01)
*H04N 21/262* (2011.01)
*H04N 21/2668* (2011.01)
*H04N 21/81* (2011.01)
*H04N 21/845* (2011.01)
*G06Q 30/02* (2012.01)
*H04L 29/06* (2006.01)

(52) U.S. Cl.
CPC ......... *H04N 21/23424* (2013.01); *G06Q 30/02* (2013.01); *H04L 65/4084* (2013.01); *H04L 65/60* (2013.01); *H04N 21/2668* (2013.01); *H04N 21/26258* (2013.01); *H04N 21/4825* (2013.01); *H04N 21/812* (2013.01); *H04N 21/8456* (2013.01)

(58) Field of Classification Search
CPC ............. H04N 21/2668; H04N 21/23424; H04N 21/26258; H04N 21/4825; H04N 21/812
See application file for complete search history.

(56) References Cited

U.S. PATENT DOCUMENTS

| 2002/0147782 | A1* | 10/2002 | Dimitrova et al. ............ 709/207 |
| 2007/0014544 | A1* | 1/2007 | Kim ............................. 386/112 |
| 2010/0131969 | A1* | 5/2010 | Tidwell et al. .................. 725/14 |
| 2011/0102600 | A1 | 5/2011 | Todd |
| 2011/0110515 | A1 | 5/2011 | Tidwell et al. |
| 2012/0047542 | A1* | 2/2012 | Lewis et al. .................... 725/97 |
| 2012/0116883 | A1* | 5/2012 | Asam et al. ................ 705/14.58 |

FOREIGN PATENT DOCUMENTS

| EP | 2618534 A1 | 7/2013 |
| WO | WO 2010/107627 A2 | 9/2010 |

OTHER PUBLICATIONS

"Using a manifest XML file to convey SCTE35 messaging information through the use of an alternative video/audio view mechanism." An IP.com Prior Art Database Technical Disclosure. Sep. 28, 2010.
White Paper: "Adaptive Streaming Ad Insertion". Jan. 1, 2011.
Islam, Safiqul: "A HTTP Steaming Video Server with Dynamic Advertisement Splicing". Master of Science Thesis, Stockholm, Sweden 2010.

* cited by examiner

*Primary Examiner* — Mark D Featherstone
*Assistant Examiner* — Carmine Malangone (57) ABSTRACT

A streaming server and a method are described herein for providing a content stream with advertisements embedded therein through a network (e.g., IP network, CDN network, wireless network) to a client (e.g., personal computer, a mobile phone, a tablet, or a HTTP capable television).

25 Claims, 5 Drawing Sheets

ADAPTIVE ADS WITH ADVERTISING MARKERS

TECHNICAL FIELD

The present invention relates to a streaming server and a method for providing a content stream with advertisements embedded therein through a network (e.g., IP network, CDN network, wireless network) to a client (e.g., personal computer, a mobile phone, a tablet, or a HTTP capable television).

BACKGROUND

The following abbreviations are herewith defined, at least some of which are referred to within the following description about at least the prior art and/or the present invention.
CDN Content Delivery Network
GPS Global Positioning Satellite
HTTP Hypertext Transfer Protocol
IP Internet Protocol
MPEG Moving Picture Experts Group
SCTE35 Society of Cable Telecommunications Engineers
RTMP Real Time Messaging Protocol
RTSP Real Time Streaming Protocol
UDP User Datagram Protocol
VOD Video-On-Demand
XML Extensible Markup Language Current broadcast technology uses advertising markers (e.g., SCTE 35s) to designate where advertisements should go in a broadcast stream or even a VOD stream. The advertising markers are basically "splice" points which indicate where an advertisement might go, not what sort of advertisement should be played there. Video providers have increasingly been experimenting with and using streaming servers such as "http adaptive streaming servers" which allows them to provide a content stream to consumers using a wide range of devices (e.g., personal computer, a mobile phone, a tablet, or HTTP capable television) while maximizing bandwidth efficiency. Although the traditional advertising markers (e.g., SCTE 35s) are embedded in the mpeg transport streams which are provided to the streaming server they are virtually invisible to the traditional streaming server's segmenting unit. This lack of compatibility with traditional advertising markers (e.g., SCTE 35s) requires companies to perform costly upgrades to their streaming servers, or buy new technologies to add advertising into the http stream or http adaptive streams. Accordingly, there has been and is a need to address this shortcoming and other shortcomings associated with the traditional streaming servers. This need and other needs are satisfied by the present invention.

SUMMARY

A streaming server, a method, and a system for providing a content stream with advertisements embedded therein through a network to a client are described in the independent claims of the present application. Advantageous embodiments of the streaming server, the method, and the system have been described in the dependent claims of the present application.

In one aspect, the present invention provides a streaming server for providing a content stream with advertisements embedded therein through a network to a client. The streaming server comprises a server and a segmenting unit. The server comprises an input interface configured to receive a request from the client to play the content stream. The segmenting unit is configured to receive the content stream and further configured to segment the content stream into a plurality of segments, wherein the content stream has advertising markers embedded therein in which the advertising markers indicate where advertisements are to be placed in the content stream. The server further comprises a processing unit configured to review the segments to identify the advertising markers, identify the advertisements to be associated with the advertising markers, and generate a manifest that includes a reference to each of the segments and the advertisements. In addition, the server comprises an output interface configured to send the manifest to the client, wherein the client is configured to use references in the manifest to retrieve the segments and advertisements associated with the content stream. An advantage of the streaming server is that it allows video providers (VOD providers and broadcast providers) to use existing infrastructure (such as targeted ad systems) to populate advertisements in near real time.

In yet another aspect, the present invention provides a method implemented by a streaming server for providing a content stream with advertisement embedded therein through a network to a client. The method comprising the steps of: (a) receiving a request from the client to play the content stream; (b) receiving the content stream; (c) segmenting the content stream into a plurality of segments, wherein the content stream has advertising markers embedded therein in which the advertising markers indicate where advertisements are to be placed in the content stream; (d) reviewing the segments to identify the advertising markers; (e) identifying the advertisements to be associated with the advertising markers; (f) generating a manifest that includes references to each of the segments and the advertisements; and (g) sending the manifest to the client, wherein the client is configured to use the references in the manifest to retrieve the segments and advertisements associated with the content stream. An advantage of the method is that it allows video providers (VOD providers and broadcast providers) to use existing infrastructure (such as targeted ad systems) to populate advertisements in near real time.

In still yet another aspect, the present invention provides a system for providing a content stream with advertisements embedded therein through a network to a client. The system comprises a content provider and a streaming server. The streaming server is configured to: (a) receive a request from the client to play the content stream; (b) receive the content stream from the content provider; (c) segment the content stream into a plurality of segments, wherein the content stream has advertising markers embedded therein in which the advertising markers indicate where advertisements are to be placed in the content stream; (d) review the segments to identify the advertising markers; (e) identify the advertisements to be associated with the advertising markers; (f) generate a manifest that includes references to each of the segments and the advertisements; and (g) send the manifest to the client, wherein the client is configured to use the references in the manifest to retrieve the segments and advertisements associated with the content stream. An advantage of the system is that it allows video providers (VOD providers and broadcast providers) to use existing infrastructure (such as targeted ad systems) to populate advertisements in near real time.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings.

DETAILED DESCRIPTION

Figure 1:
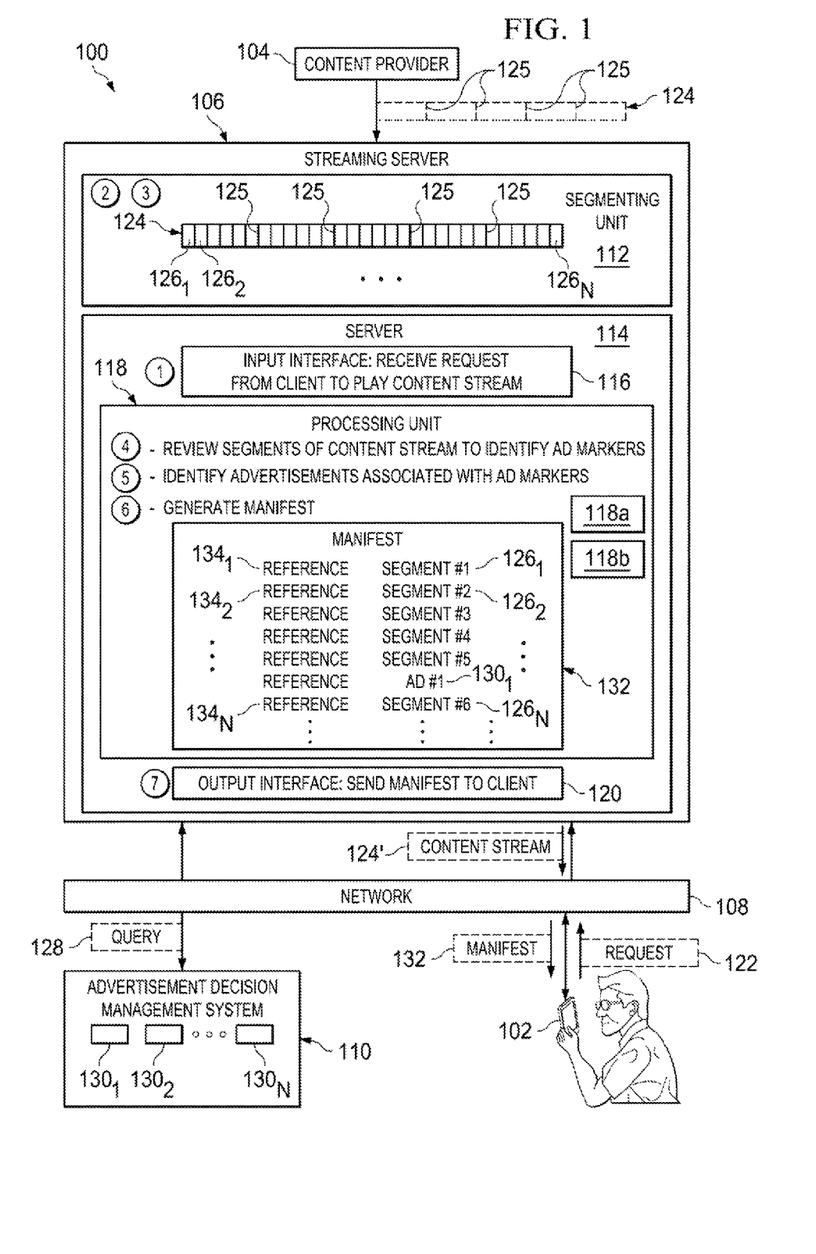
FIG. 1 is a diagram of a system including an exemplary streaming server configured to provide a content stream with advertisements embedded therein through a network to a client in accordance with an embodiment of the present invention.

Referring to FIG. 1, there is a diagram of an exemplary system 100 configured to provide a content stream with advertisements embedded therein to a client 102 in accordance with an embodiment of the present invention. The system 100 includes a content provider 104, a streaming server 106, a network 108 (e.g., IP network 108, CDN network 108, wireless network 108 or any combination thereof), and an advertising decision management system 110. The content provider 104 interfaces with the streaming server 106 which in turn interfaces with the advertising decision management system 110 and the client 102 (only one shown) through the network 108. Alternatively, the content provider 104 may be connected to the streaming server 106 through the network 108. In this example, the streaming server 106 includes a segmenting unit 112 and a server 114 (e.g., HTTP server 114). The server 114 includes an input interface 116, a processing unit 118, and an output interface 120. In this example, the processing unit 118 includes a processor 118a which executes process-executable instructions stored in a memory 118a to enable the operations described below. The streaming server 106 may include other well known components but for clarity those well known components are not described herein while the components 112, 114, 116, 118 and 120 which are relevant to the invention are described in detail herein.

A discussion is provided next about how the streaming server 106 is configured to provide a content stream with advertisements embedded therein to a client 102 (e.g., personal computer 102, a mobile phone 102 (shown), a tablet 102, or a HTTP capable television 102). In particular, the input interface 116 is configured to receive a request 122 from the client 102 to play a content stream 124 (step 1). The segmenting unit 112 is configured to receive the content stream 124 from the content provider 104 (e.g., broadcast network 104, VOD provider 104, content store 104) (step 2). The content stream 124 has advertising markers 125 (e.g., SCTE 35s 125) embedded therein which indicate where advertisements are to be placed in the resulting content stream 124'. In addition, the segmenting unit 112 is configured to segment the content stream 124 into a plurality of segments $126_1, 126_2 \ldots 126_n$ where the advertising markers 125 remain in the segments $126_1, 126_2 \ldots 126_n$ (step 3) (note: the advertising markers 125 are located at boundaries between the segments $126_1, 126_2 \ldots 126_n$ as shown in FIG. 1). The processing unit 118 is configured to review the segments $126_1, 126_2 \ldots 126_n$ to identify the advertising markers 125 (step 4). For example, the processing unit 118 can identify the advertising markers 125 by reading an advertising marker data stream (e.g., SCTE 35 data stream) which is multiplexed into the transport stream 124 along with the video and audio content streams. For example, the SCTE 35 data stream includes SCTE 35 markers 125 which generally occur up to 10 seconds before a splice point where an advertisement is to be played and can occur several times up to the splice point. The advertising markers 125 include time information for the splice start time duration or a start and end time to perform the splice. The processing unit 118 upon identifying the advertising markers 125 then sends a query 128 (e.g., SCTE 130) to the advertising decision management system 110 to identify the specific advertisements $130_1, 130_2 \ldots 130_n$ which are to be used in response to the advertising markers 125 (step 5). In one example, the processing unit 118 sends a query 128 including information about the client 102 to the advertising decision management system 110 which then decides what advertisements $130_1, 130_2 \ldots 130_n$ to use in response to the advertising markers 125 based on individual client information (e.g., demographics, location). Thereafter, the processing unit 118 is configured to generate a manifest 132 that includes a reference $134_1, 134_2 \ldots 134_n$ to each of the segments $126_1, 126_2 \ldots 126_n$ and the advertisements $130_1, 130_2 \ldots 130_n$ (step 6). Alternatively, the processing unit 114 can be configured to generate a master manifest which includes multiple manifests 132 each of which are associated with a different bit rate of the content stream 124. Finally, the output interface 120 is configured to send the manifest 132 (or master manifest) to the client 102 which is configured to use references $134_1, 134_2 \ldots 134_n$ in the manifest 132 to retrieve and playback the segments $126_1, 126_2 \ldots 126_n$ and advertisements $130_1, 130_2 \ldots 130_n$ associated with the content stream 124 (step 7). The client 102 may receive the content stream 124' as a linear single bit rate content stream 124', a multi-bit rate content stream 124', a time shifted-startover stream 124', or a VOD content stream 124'.

Figure 2:
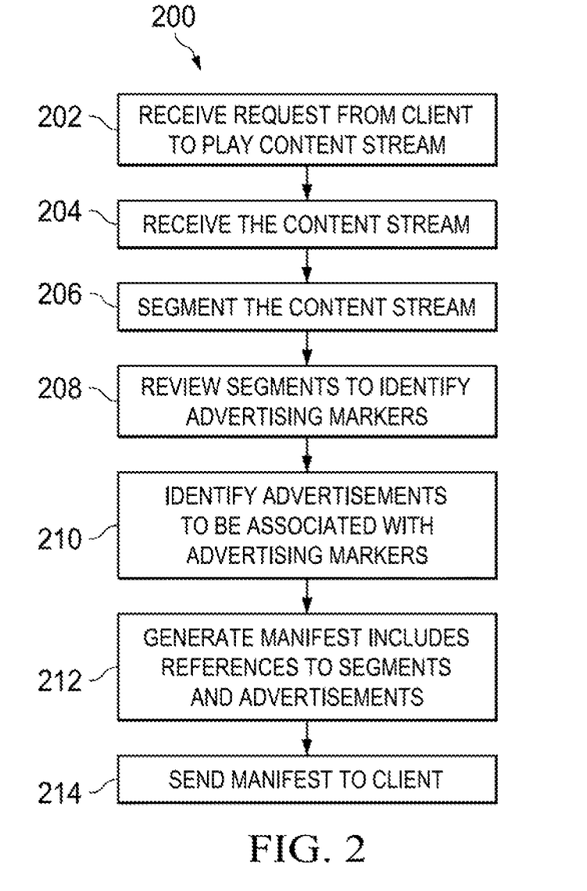
FIG. 2 is a flowchart illustrating the steps of an exemplary method implemented by a streaming server to provide a content stream with advertisements embedded therein through a network to a client in accordance with an embodiment of the present invention.

Referring to FIG. 2, there is a flowchart illustrating the steps of an exemplary method 200 implemented by the streaming server 106 to provide a content stream 124' with advertisements embedded therein to a client 102 in accordance with an embodiment of the present invention. At step 202, the streaming server 106 receives a request 122 from the client 102 to play a content stream 124. At step 204, the streaming server 106 requests and receives the content stream 124 from the content provider 104 (e.g., broadcast network 104, VOD provider 104, content store 104). The content stream 124 has advertising markers 125 (e.g., SCTE 35s 126) embedded therein which indicate where advertisements are to be placed in the content stream 124. At step 206, the streaming server 106 segments the content stream 124 into a plurality of segments $126_1$, $126_2$ ... $126_n$ where the advertising markers 125 remain in the segments $126_1$, $126_2$ ... $126_n$. At step 208, the streaming server 106 reviews the segments $126_1$, $126_2$ ... $126_n$ to identify the advertising markers 125. For example, the processing unit 118 can identify the advertising markers 125 by 125 an advertising marker data stream (e.g., SCTE 35 data stream) which is multiplexed into the transport stream 124 along with the video and audio content streams. For example, the SCTE 35 data stream includes SCTE 35 markers 125 which generally occur up to 10 seconds before a splice point where an advertisement is to be played and can occur several times up to the splice point. The advertising markers 125 include time information for the splice start time duration or a start and end time to perform the splice. At step 210, the streaming server 106 upon identifying the advertising markers 125 identifies the specific advertisements $130_1$, $130_2$ ... $130_n$ which are to be used in response to the advertising markers 125 by sending a query 128 (e.g., SCTE 130) to the advertising decision management system 110. In one example, the processing unit 114 sends a query 128 including information about the client 102 to the advertising decision management system 110 which then decides what advertisements $130_1$, $130_2$ ... $130_n$ to use in response to the advertising markers 125 based on individual client information (e.g., demographics, location). At step 212, the streaming server 106 generates a manifest 132 that includes a reference $134_1$, $134_2$ ... $134_n$ to each of the segments $126_1$, $126_2$ ... $126_n$ and the advertisements $130_1$, $130_2$ ... $130_n$. Alternatively, the streaming server 106 can be configured to generate a master manifest which includes multiple manifests 132 each of which are associated with a different bit rate of the content stream 124. At step 214, the streaming server 106 sends the manifest 132 (or master manifest) to the client 102 which is configured to use references $134_1$, $134_2$ ... $134_n$ in the manifest 132 to retrieve and playback the segments $126_1$, $126_2$ ... $126_n$ and advertisements $130_1$, $130_2$ ... $130_n$ associated with the content stream 124'. The client 102 may receive a content stream 124' as a linear single bit rate content stream 124', a multi-bit rate content stream 124', a time shifted-strartover stream 124', or a VOD content stream 124'.

Figure 3:
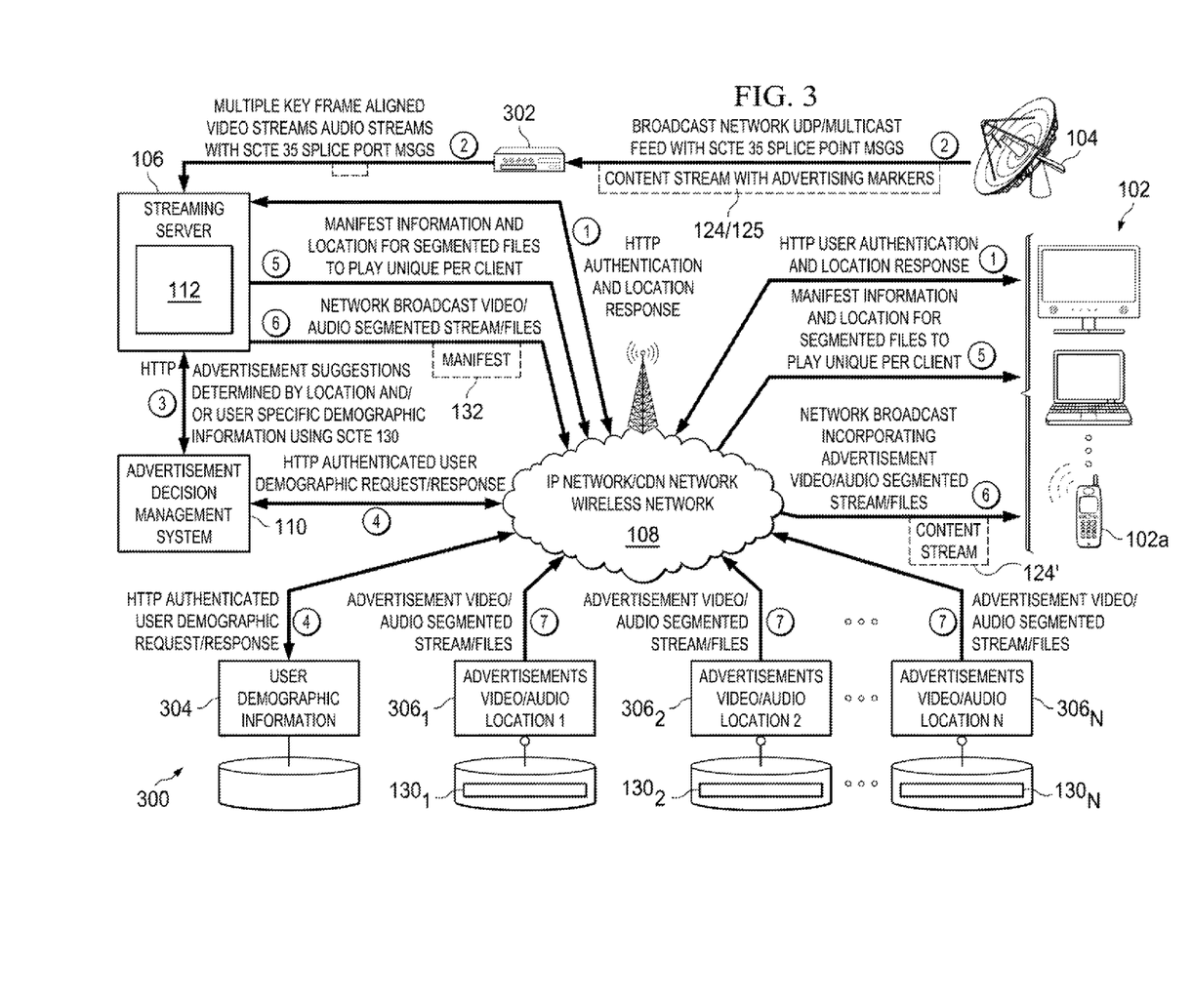
FIG. 3 is a diagram of an exemplary system including a streaming server configured to insert advertisements in a content stream (e.g., multi-bit rate content stream) provided to a client in a broadcast environment in accordance with an embodiment of the present invention.

Referring to FIG. 3, there is a diagram of an exemplary system 300 including the streaming server 106 configured to insert advertisements in a content stream 124 (e.g., multi-bit rate content stream 124) provided to a client 102a in a client broadcast environment in accordance with an embodiment of the present invention. In this example, the content stream 124 (mpeg data 124) with advertising markers 125 (e.g., SCTE 35 markers) is received from an adaptive streaming friendly encoder/transcoder 302 via a content provider 104 (broadcast network 104) and then fed into the streaming server's segmenting unit 112 in response to a request from a particular client 102a. The resulting adaptive content stream 124' along with the relevant advertisements $130_1$, $130_2$ ... $130_n$ is fed to the particular client 102a as the mpeg content stream 124 is received by the streaming server 106. The advertisements $130_1$, $130_2$ ... $130_n$ are chosen based on demographic and/or location information of the particular client 102a, if available. The exemplary system 300 includes the following components:

Adaptive Streaming Clients 102: personal computers, mobile phones/tablets, http capable televisions, etc.

Adaptive Streaming Friendly Encoder/Transcoder 302: preserves all advertising markers 125 (e.g., SCTE35 markers) when encoding/transcoding the content stream 124 (e.g., broadcast network UDP/multicast feed with SCTE 35 splice point messages) received from the content provider 104 (e.g., broadcast network 104). The advertising markers 125 can be SCTE 35, Avail Markers identified in XML with time codes associated with ad insertion/replacements start and end times or any other means of defining ad insertion/replacement times.

Adaptive Streaming Server 106: handles segmenting the content stream 124 received from the adaptive streaming friendly encoder/transcoder 302 and produces the manifest 132 for the finished content stream 124'.

IP Network/CDN Network/Wireless Network 108: handles transmitting the finished adaptive content stream 124' to the requesting client 102a.

Advertisement Decision Management System 110: decides what advertisements $130_1$, $130_2$ ... $130_n$ based on a query (e.g. SCTE130) for individual client information (demographics, location, etc.) to put in the content stream 124 in response to advertisement markers 125 (e.g., SCTE 35 markers).

User Demographic Information Database 304: the database which contains demographic information associated with the client(s) 102. For example, the demographic information may include the age, gender, income, hobbies, interests, pets, children, food preferences, employment, etc. of the client(s) 102.

Advertisement Video/Audio Databases $306_1$, $306_2$, ... $306_N$: stores the mpeg stream corresponding to the advertisements $130_1$, $130_2$ ... $130_n$. The advertisements $130_1$, $130_2$ ... $130_n$ can be stored anywhere, so long as the Ad Decision Campaign Management System 110 has access to them.

The exemplary system 300 may include many other well known components but for clarity those well known components are not described herein while the components 102, 106, 108, 110, 302, 304, and $306_1$, $306_2$ ... $306_N$ which are relevant to the invention have been described. The exemplary system 300 is configured to provide a finished adaptive content stream 124' with advertisements $130_1$, $130_2$ ... $130_n$ embedded therein to a requesting client 102a as follows:

1. Client 102a (for example) transmits their authentication (user details) and location when requesting a content stream 124.
2. The original mpeg content stream 124 is delivered in real time to the adaptive streaming servers 106 for processing.
3. The adaptive streaming server 106 processes one or more advertising messages 125 and queries (e.g., SCTE 130) the advertisement decision management system 110 about what advertisements to include.
4. The advertisement decision campaign management system 110 queries the user demographic information database 304 to find out the demographics of the requesting client 102a.
5. The streaming server 106 sends the resulting manifest 132 (metadata file 132) to the requesting client 102a.
6. The segments $126_1$, $126_2$ ... $126_n$ from the original content stream 124 are requested by and sent to the client 102a (which is utilizing the manifest 132) from where they are temporarily stored within the adaptive streaming server 106.
7. The segments from the advertising content $130_1$, $130_2$ ... $130_n$ are requested by and sent to the client 102a (which is utilizing the manifest 132) from the particular advertisement video/audio database $306_1$, $306_2$ ... $306_N$ within which they are stored.

Figure 4:
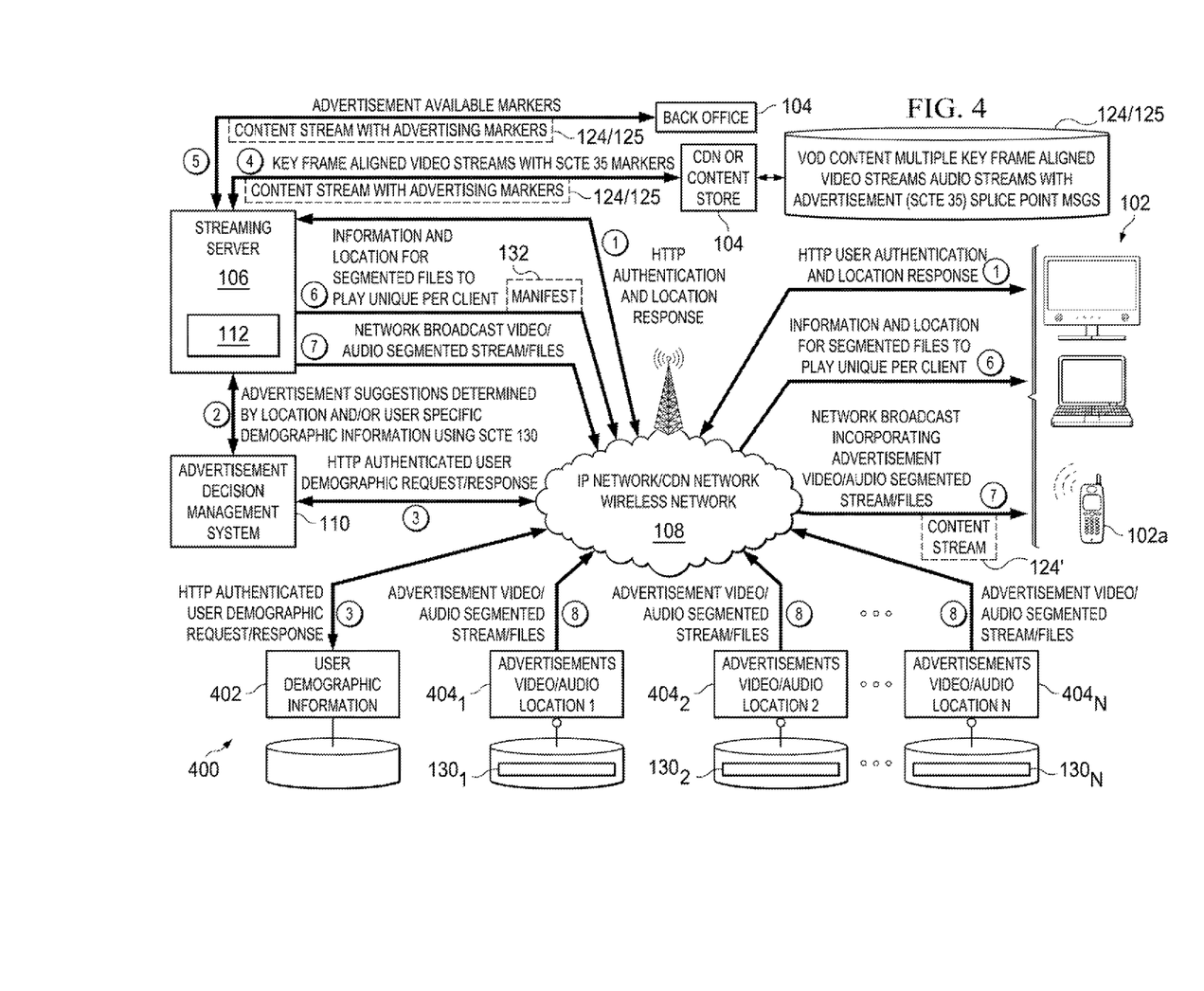
FIG. 4 is a diagram of an exemplary system including a streaming server configured to insert advertisements in a content stream (e.g., multi-bit rate content stream, single bit rate content stream) provided to a client in a VOD environment in accordance with an embodiment of the present invention.

Referring to FIG. 4, there is a diagram of an exemplary system 400 including the streaming server 106 configured to insert advertisements in a content stream 124 (e.g., multi-bit rate content stream 124, single bit rate content stream 124)

provided to a client 102a in a VOD environment in accordance with an embodiment of the present invention. In this example, the content stream 124 (mpeg data 124) with advertising markers 125 (e.g., SCTE35 markers) is received from a content provider 104 (content store 104, back office 104) and stored locally, and then fed into the streaming server's segmenting unit 112 in response to a request from a particular client 102a. The resulting adaptive content stream 124' is fed to the particular client 102a, along with the relevant advertisements $130_1$, $130_2$ ... $130_n$. The advertisements $130_1$, $130_2$ ... $130_n$ are chosen based on demographic and/or location information of the particular client 102, if available. The exemplary system 400 includes the following components:

Streaming Clients 102: personal computers, mobile phones/tablets, http capable televisions, etc.

Streaming Server 106: handles segmenting the content stream 124 received from the content provider 104 and produces the manifest 132 for the finished content stream 124'.

IP Network/CDN Network/Wireless Network 108: handles transmitting the finished adaptive content stream 124' to the requesting client 102a.

Advertisement Decision Management System 110: decides what advertisements $130_1$, $130_2$ ... $130_n$ based on individual client information (demographics, location, etc.) to put in the content stream 124 in response to advertisement markers 125 (e.g., SCTE 35 markers). The advertising markers 125 can be SCTE 35, Avail Markers identified in XML with time codes associated with ad insertion/replacements start and end times or any other means of defining ad insertion/replacement times.

User Demographic Information Database 402: the database which contains demographic information associated with the client(s) 102. For example, the demographic information may include the age, gender, income, hobbies, interests, pets, children, food preferences, employment, etc. of the client(s) 102.

Advertisement Video/Audio Databases $404_1$, $404_2$ ... $404_N$: stores the mpeg stream corresponding to the advertisements $130_1$, $130_2$ ... $130_n$. The advertisements $130_1$, $130_2$ ... $130_n$ can be stored anywhere, so long as the Ad Decision Campaign Management System 110 has access to them.

The exemplary system 400 may include many other well known components but for clarity those well known components are not described herein while the components 102, 106, 108, 110, 402, and $404_1$, $404_2$ ... $406_N$ which are relevant to the invention have been described. The exemplary system 400 is configured to provide a finished adaptive content stream 124' with advertisements $130_1$, $130_2$ ... $130_n$ embedded therein to a requesting client 102a as follows:

1. Client 102a (for example) transmits their authentication (user details) and location when requesting a VOD content stream 124.

2. The streaming server 106 asks (e.g. SCTE130) the advertisement decision management system 110 what ads to include for the particular requested VOD content stream 124.

3. The advertisement decision campaign management system 110 queries the user demographic information database 402 to find out the demographics of the requesting client 102a.

4. The streaming server 106 sends a request to the content provider 104 (CDN or content store 104) to obtain the VOD file to process using existing protocols such as http, rtmp, rtsp, etc.

5. The streaming server 106 sends a request to the content provider 104 (back office 104) to obtain and process the advertising markers 125 (e.g., SCTE 35 markers). For example, the SCTE 35 markers will be in an advertising data stream multiplexed into the transport stream with the audio and video content. In the case of Avail Markers, the advertising data stream could be an embedded in XML associated with the VOD content per the Cablelabs specification (see www.cablelabs.org.)

6. The streaming server 106 sends the resulting manifest 132 (metadata file 132) to the requesting client 102a.

7. The segments $126_1$, $126_2$ ... $126_n$ from the original content stream 124 are requested by and sent to the client 102a (which is utilizing the manifest 132) from where they are temporarily stored within the adaptive streaming server 106.

8. The segments from the advertising content $130_1$, $130_2$ ... $130_n$ are requested by and sent to the client 102a (which is utilizing the manifest 132) from the particular advertisement video/audio database $306_1$, $306_2$ ... $306_N$ within which they are stored.

Figure 5:
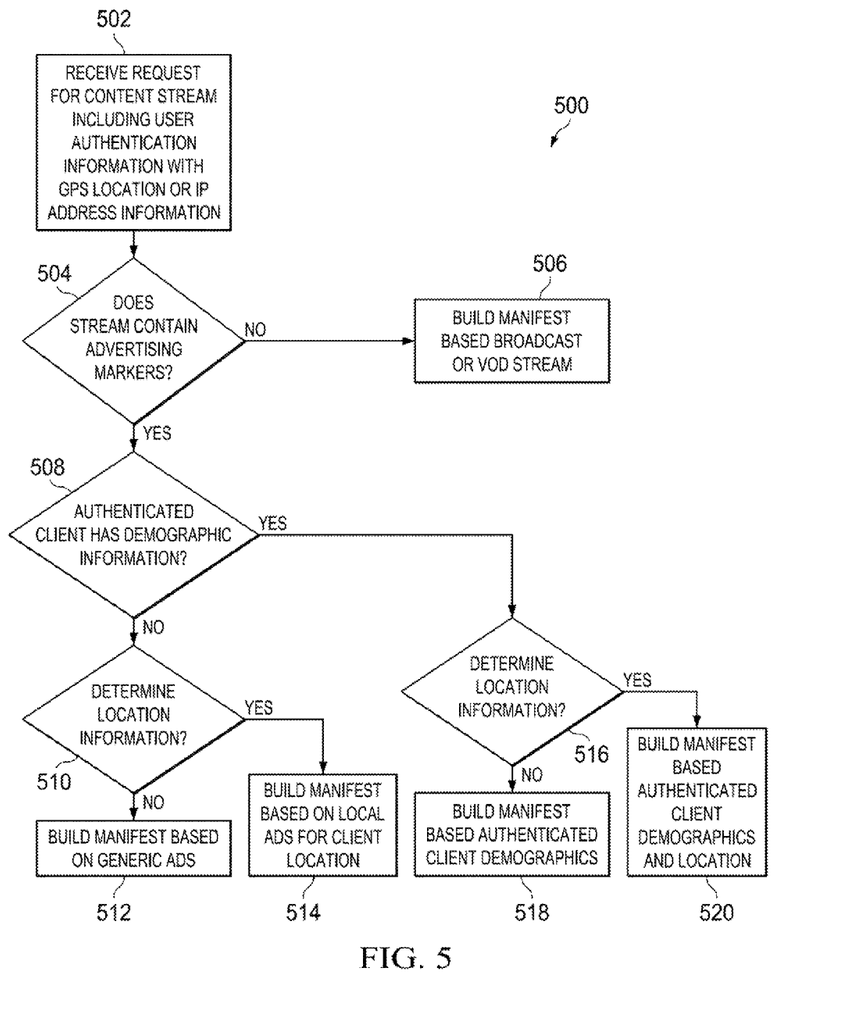
FIG. 5 is a flowchart illustrating the steps of an exemplary method implemented by the streaming server for retrieving a content stream and building a manifest in accordance with an embodiment of the present invention.

Referring to FIG. 5, there is a flowchart illustrating the steps of an exemplary method 500 implemented by the streaming server 106 for retrieving a content stream 124 and building a manifest 132 in accordance with an embodiment of the present invention. At step 502, the streaming server 106 receives a request 122 from client 102 to view the content stream 124 where the request 122 includes user authentication information with possibly GPS location or IP address information. At step 504, the streaming server 106 determines if the content stream 124 contains advertising markers 125 (e.g., SCTE 35 markers). If the result of step 504 is no, then the streaming server 106 at step 506 builds the manifest 132 based on the broadcast or VOD content stream 124. If the result of step 504 is yes, then the streaming server 106 at step 508 determines if the authenticated client 102 has demographic information stored in a user demographic information database 304 or 402. If the result of step 508 is no, then the streaming server 106 at step 510 ascertains if able to determine the location of the authenticated client 102. For example, the streaming server 106 can determine the location of the authenticated client 102 based on GPS information, triangulation or IP address lookup. If the result of step 510 is no, then the streaming server 106 at step 512 builds the manifest 132 based on the broadcast or VOD content stream 124 and generic advertisements $130_1$, $130_2$ ... $130_n$. If the result of step 510 is yes, then the streaming server 106 at step 514 builds the manifest 132 based on the broadcast or VOD content stream 124 and local advertisements $130_1$, $130_2$ ... $130_n$ associated with the location of the client 102. If the result of step 508 is yes, then the streaming server 106 at step 516 ascertains if able to determine the location of the authenticated client 102. If the result of step 516 is no, then the streaming server 106 at step 518 builds the manifest 132 based on the broadcast or VOD content stream 124 and advertisements $130_1$, $130_2$ ... $130_n$ associated with the demographics of the client 102. If the result of step 516 is yes, then the streaming server 106 at step 520 builds the manifest 132 based on the broadcast or VOD content stream 124 and advertisements $130_1$, $130_2$ ... $130_n$ associated with the location and demographics of the client 102.

From the foregoing, the skilled person having the foregoing teaching will readily appreciate that a system has been disclosed which includes a streaming server 106 composed of a segmenting unit 112 and other devices that takes in a mpeg content stream 124, pays attention to advertising markers 125 (e.g., SCTE 35 markers), and composes a content stream 124' which is comprised of both original stream content and advertisements. For example, the streaming server 106 would build a manifest 132 which alternatively references both content and advertisements. In one example, the advertisements can be selected by interfacing (e.g. SCTE 130) with an advertisement decision management system 110 (such as Ericsson's "AdPoint" system). The streaming server 106 could work for both single bit-rate and multi-bit rate VOD, broadcast live, liner broadcast, or time-shifted/startover streams, as necessary. The streaming server's 106 ability to allow advertising markers 125 (e.g., SCTE35 markers) to apply to the http streaming technologies and http adaptive streaming technologies has many advantages. For example, the streaming server 106 allows video providers (both of VOD and broadcast) to use existing infrastructure (such as targeted ad systems) to populate advertisements in near real time. Additionally, the streaming server 106 allows targeted advertisements in broadcast where traditionally all clients 102 see the same advertisements, regardless of demographics.

Although multiple embodiments of the present invention have been illustrated in the accompanying Drawings and described in the foregoing Detailed Description, it should be understood that the invention is not limited to the disclosed embodiments, but instead is also capable of numerous rearrangements, modifications and substitutions without departing from the present invention that as has been set forth and defined within the following claims.

The invention claimed is:

1. A streaming server for providing a content stream with advertisements embedded therein through a network to a client, the streaming server comprising:
    a server comprising an input interface programmed to receive a request from the client to play the content stream;
    a segmenting unit programmed to (i) receive the content stream which may or may not contain advertising markers embedded therein and (ii) segment the content stream into a plurality of content stream segments where the advertising markers when present remain in the content stream segments, wherein the advertising markers indicate where advertisements are to be placed in the content stream; and
    the server further comprising:
        a processing unit programmed to determine if the content stream segments contain advertising markers embedded therein;
        (a) when the content stream segments are determined not to contain advertising markers the processing unit is programmed to build a content manifest based on the content stream segments not containing advertising markers;
        (b) when the content stream segments are determined to contain advertising markers the processing unit is programmed to:
            (i) determine if the client has demographic information stored in a database;
            (ii) review the content stream segments to identify the advertising markers;
            (iii) identify the advertisements to be associated with the advertising markers based at least in part on the stored demographic information if any;
            (iv) adjust time codes of references to the content stream segments and the advertisements so they are consecutive time codes; and
            (v) generate a content-advertisement manifest that includes the references of each of the content stream segments and the advertisements; and
        an output interface programmed to (i) send the content manifest to the client when the content stream segments are determined not to contain advertising markers embedded therein and (ii) send the content-advertisement manifest to the client when the content stream segments are determined to contain advertising markers embedded therein.

2. The streaming server of claim 1, wherein the content stream segments contain video packets and audio packets which have matching time codes.

3. The streaming server of claim 1, wherein the segmenting unit receives the content stream as a multi-program transport stream format then the segmenting unit is programmed to extrapolate the multi-program transport stream format into multiple single-program stream formats in which each single-program stream format is segmented into a plurality of content stream segments.

4. The streaming server of claim 1, wherein the segmenting unit receives the content stream as a video-on-demand stream, a broadcast live stream, a broadcast linear stream, or a time shifted-startover stream.

5. The streaming server of claim 1, wherein the processing unit interfaces with an advertisement decision management system to identify the advertisements.

6. The streaming server of claim 5, wherein the processing unit uses a Society of Cable Telecommunications Engineers (SCTE) 130 to interface with the advertisement decision management system to identify the advertisements.

7. The streaming server of claim 5, wherein the advertisements are selected based on information associated with the client.

8. The streaming server of claim 7, wherein the information includes at least one of demographic information and location information associated with the client.

9. The streaming server of claim 1, wherein the advertising markers are Society of Cable Telecommunications Engineers (SCTE) 35s, or Avail Markers identified in Extensible Markup Language (XML).

10. The streaming server of claim 1, wherein the client is one of a personal computer, a mobile phone, a tablet, or a Hypertext Transfer Protocol (HTTP) capable television.

11. The streaming server of claim 1, wherein the advertising markers are located at boundaries between the segments.

12. A method implemented by a streaming server for providing a content stream with advertisements embedded therein through a network to a client, the method comprising the steps of:
    receiving, by the streaming server, a request from the client to play the content stream;
    receiving, by the streaming server, the content stream which may or may not contain advertising markers embedded therein;
    segmenting, by the streaming server, the content stream into a plurality of content stream segments where the advertising markers when present remain in the content stream segments, wherein the advertising markers indicate where advertisements are to be placed in the content stream;
    determining, by the streaming server, if the content stream segments contain advertising markers embedded therein;
        (a) when the content stream segments are determined not to contain advertising markers building by the streaming server a content manifest based on the content stream segments not containing advertising markers;

(b) when the content stream segments are determined to contain advertising markers the streaming server performs the following steps:
   (i) determining if the client has demographic information stored in a database;
   (ii) reviewing the content stream segments to identify the advertising markers;
   (iii) identifying the advertisements to be associated with the advertising markers based at least in part on the stored demographic information if any;
   (iv) adjusting time codes of references to the content stream segments and the advertisements so they are consecutive time codes; and
   (v) generating a content-advertisement manifest that includes the references of each of the content stream segments and the advertisements; and
sending, by the streaming server, the content manifest to the client when the content stream segments are determined not to contain advertising markers embedded therein or sending, by the streaming server, the content-advertisement manifest to the client when the content stream segments are determined to contain advertising markers embedded therein.

13. The method of claim 12, wherein the content stream segments contain video packets and audio packets which have matching time codes.

14. The method of claim 12, wherein if the content stream is a multi-program transport stream format then extrapolating the multi-program transport stream into multiple single-program stream formats in which each single-program stream format is segmented into a plurality of content stream segments.

15. The method of claim 12, wherein the content stream is a video-on-demand stream, a broadcast live stream, a broadcast linear stream, or a time shifted-startover stream.

16. The method of claim 12, wherein the identifying step further comprises the step of interfacing with an advertisement decision management system to identify the advertisements.

17. The method of claim 16, wherein a Society of Cable Telecommunications Engineers (SCTE) 130 is used to interface with the advertisement decision management system to identify the advertisements.

18. The method of claim 16, wherein the advertisements are selected based on information associated with the client.

19. The method of claim 18, wherein the information includes at least one of demographic information and location information associated with the client.

20. The method of claim 12, wherein the advertising markers are Society of Cable Telecommunications Engineers (SCTE) 35s, or Avail Markers identified in Extensible Markup Language (XML).

21. The method of claim 12, wherein the client is one of a personal computer, a mobile phone, a tablet, or a Hypertext Transfer Protocol (HTTP) capable television.

22. The method of claim 12, wherein the advertising markers are located at boundaries between the segments.

23. A system for providing a content stream with advertisements embedded therein through a network to a client, the system comprising:
   a content provider;
   a streaming server;
   the streaming server is programmed to:
      receive a request from the client to play the content stream;
      receive the content stream which may or may not contain advertising markers embedded therein;
      segment the content stream into a plurality of content stream segments where the advertising markers when present remain in the content stream segments, wherein the advertising markers indicate where advertisements are to be placed in the content stream;
      determine if the content stream segments contain advertising markers embedded therein;
         (a) when the content stream segments are determined not to contain advertising markers build a content manifest based on the content stream segments not containing advertising markers;
         (b) when the content stream segments are determined to contain advertising markers the streaming server is further programmed to:
            (i) determine if the client has demographic information stored in a database;
            (ii) review the content stream segments to identify the advertising markers;
            (iii) identify the advertisements to be associated with the advertising markers based at least in part on the stored demographic information if any;
            (iv) adjust time codes of references to the content stream segments and the advertisements so they are consecutive time codes; and
            (v) generate a content-advertisement manifest that includes the references of each of the content stream segments and the advertisements; and
      send the content manifest to the client when the content stream segments are determined not to contain advertising markers embedded therein and send the content-advertisement manifest to the client when the content stream segments are determined to contain advertising markers embedded therein.

24. The system of claim 23, further comprising:
   an advertisement decision management system;
   a demographic data base for storing demographic information associated with the client; and
   at least one advertising data base for storing the advertisements.

25. The system of claim 23, wherein the advertising markers are located at boundaries between the segments.

* * * * *